(12) United States Patent
Doorandish (10) Patent No.: US 11,825,583 B1
(45) Date of Patent: Nov. 21, 2023

(54) SMART LIGHTING MANAGEMENT SYSTEM

(71) Applicant: Mehdi Doorandish, Van Nuys, CA (US)

(72) Inventor: Mehdi Doorandish, Van Nuys, CA (US)

( * ) Notice: Subject to any disclaimer, the term of this patent is extended or adjusted under 35 U.S.C. 154(b) by 54 days.

(21) Appl. No.: 17/727,410

(22) Filed: Apr. 22, 2022

(51) Int. Cl.
*H05B 47/20* (2020.01)
*H05B 47/14* (2020.01)
*G05B 13/02* (2006.01)

(52) U.S. Cl.
CPC ......... *H05B 47/20* (2020.01); *G05B 13/0265* (2013.01); *H05B 47/14* (2020.01)

(58) Field of Classification Search
None
See application file for complete search history.

(56) References Cited

U.S. PATENT DOCUMENTS

| | | | |
|---|---|---|---|
| 8,937,557 B2 | 1/2015 | Loveland et al. | |
| 10,701,786 B2 | 6/2020 | Recker et al. | |
| 10,741,059 B2 | 8/2020 | Moore et al. | |
| 2014/0245071 A1* | 8/2014 | Drees | H02J 13/00004 714/39 |
| 2020/0068680 A1* | 2/2020 | Neudorf | H05B 45/10 |
| 2021/0185789 A1 | 6/2021 | Smith et al. | |

* cited by examiner

*Primary Examiner* — Dedei K Hammond
(74) *Attorney, Agent, or Firm* — Alexander Postnikov (57) ABSTRACT

Methods and systems for the management of the electric lighting circuits are disclosed. The method includes monitoring one or more lighting circuits connected to a controller through one or more sensors. The one or more sensors are connected to the one or more lighting circuits and the controller. Further, the method includes detecting a change in current of a lighting circuit of the one or more lighting circuits. Furthermore, the method includes determining an anomaly in the lighting circuit based on the detected change in current of the lighting circuit. Thereafter, the method includes transmitting a report including at least the anomaly to a server for verification of the anomaly, in response to the determination.

20 Claims, 7 Drawing Sheets

SMART LIGHTING MANAGEMENT SYSTEM

TECHNICAL FIELD

The present disclosure is related generally to methods and systems for monitoring lighting devices in a closed lighting circuit and, more particularly to a smart lighting management (SLM) platform that manages lighting circuits in an establishment.

BACKGROUND

Modern technology is creating a pathway for essential industries to adapt to environmentally-conscious devices, and it is introducing an entirely new way of operating and using energy. According to the Department of Energy (DOE), commercial buildings consume 17% of the U.S. electricity for lighting, being the largest end-user of electricity while using outdated mechanical timers and photocells. For decades commercial establishments (apartment buildings, car dealerships, etc.) and some residential buildings lighting systems have been controlled and managed by photocells, mechanical and digital timers which are inefficient.

The number of electrical devices around us grows every day. Many of these devices have limited lifespans and have to be regularly repaired or replaced. Usually, light bulbs burn out after continuous usage. As a result, facility managements generally rely on user reports or have workers patrol areas to detect such outages/burnouts of bulbs. Other potential faults, such as decorative, accent, or rooftop lighting may not be apparent immediately and may require additional troubleshooting.

"Smart" lighting solutions attempt to solve some of these problems but come with a high cost of entry. In order to have an effective smart lighting system, a facility must first invest in changing all of their "dumb" lights to "smart" lights—this cost can be prohibitively expensive.

Therefore, there is a need for making the entire lighting circuits smart and efficient management of existing lighting systems to minimize troubleshooting, down-time, and cost.

SUMMARY

Various embodiments of the present disclosure provide methods and systems for the management of the electric lighting circuits.

In an embodiment, a method is disclosed. The method includes monitoring, by a controller through one or more sensors, one or more lighting circuits connected to the controller, where the one or more sensors are connected to the one or more lighting circuits and the controller. Further, the method includes detecting a change in current of a lighting circuit of the one or more lighting circuits. The method further includes determining an anomaly in the lighting circuit based on the detected change in current of the lighting circuit. Thereafter, the method includes transmitting a report including at least the anomaly to a server for verification of the anomaly, in response to the determination.

In another embodiment, a method is disclosed. The method includes receiving, by the server, a report from a controller, where the report includes information related to a determination of an anomaly and data related to change in current in a lighting circuit, and where the anomaly is determined by the controller based on a change in current in the lighting circuit. Further, the method includes verifying, by the server, the anomaly in the report based on anomalies, corresponding to changes in current values, stored in the server. Thereafter, the method includes sending, by the server, a notification to a user device upon successful verification of the anomaly, wherein the user device is associated with the lighting circuit.

In yet another embodiment, a controller for the management of lighting circuits is disclosed. The controller comprises an energy metering chip configured to monitor, through one or more sensors, one or more lighting circuits connected to the controller, where the one or more sensors are connected to the one or more lighting circuits and the controller. Further, the controller comprises a microcontroller electrically coupled to the energy metering chip. The microcontroller is configured to detect a change in current of a lighting circuit of the one or more lighting circuits, and determine an anomaly in the lighting circuit based on the detected change in current of the lighting circuit. Thereafter, the controller comprises a communication module electrically coupled to the microcontroller, and the communication module is configured to transmit a report including at least the anomaly to a server for verification of the anomaly, in response to the determination.

In another embodiment, a server for the management of lighting circuits is disclosed. The server comprises a processor, a communication module; and a memory for storing instructions which, when executed by the processor, cause the server at least in part, to: receive a report from a controller, where the report includes information related to a determination of an anomaly and data related to change in current in a lighting circuit, and where the anomaly is determined by the controller based on the change in current in the lighting circuit; verify the anomaly in the report based on anomalies, corresponding to change in current values, stored in a memory of the server, and send a notification to a user device upon successful verification of the anomaly, where the user device is associated with the lighting circuit.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "electrical lighting circuit", "closed lighting circuit", "lighting circuit", "circuit path," and "circuit" have been used interchangeably throughout the description, and they refer to any interconnection of lighting elements.

Overview

Various embodiments of the present disclosure provide methods and systems for the management of the electric lighting circuits. In one embodiment, the system includes a smart lighting management (SLM) controller, an SLM server, and a user device to control one or more lighting circuits. The SLM controller is installed in line with electric lighting circuits by a service provider for monitoring the lighting circuits. A lighting circuit includes one or more lighting elements (such as bulbs, LEDs, etc.) connected in a series and/or parallel connection. If there is a change in current drawn by a lighting circuit, the SLM controller detects the change in current in the lighting circuit and determines an anomaly in the lighting circuit based on a comparison between a detected change in current and a threshold value. The SLM controller transmits a report to the SLM server managed by the service provider. The report includes information regarding a determination of the anomaly and information about the lighting circuit in which the anomaly was detected. The report is transmitted to the SLM server for verification of the anomaly before sending a notification to the user device associated with the lighting circuit.

In another embodiment, the SLM server receives the report, from the SLM controller, regarding the determination of the anomaly in the lighting circuit. The SLM server manages one or more SLM controllers. Upon receiving a report, the SLM server verifies the anomaly indicated in the report based on a comparison between the change in current and a threshold value for that lighting circuit. Upon successful verification of the anomaly, which indicates that there is an issue in the lighting circuit, the SLM server sends a notification indicating the detection of the anomaly to a user device. The user device is associated with the lighting circuit and is installed with an SLM application.

Although process steps, method steps, or the like in the disclosure may be described in sequential order, such processes and methods may be configured to work in alternate orders. In other words, any sequence or order of steps that may be described in this patent application does not, in and of itself, indicate a requirement that the steps need to be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred.

Various embodiments of methods and systems for management of one or more lighting circuits are further described with reference to FIG. 1 to FIG. 9.

Figure 1:
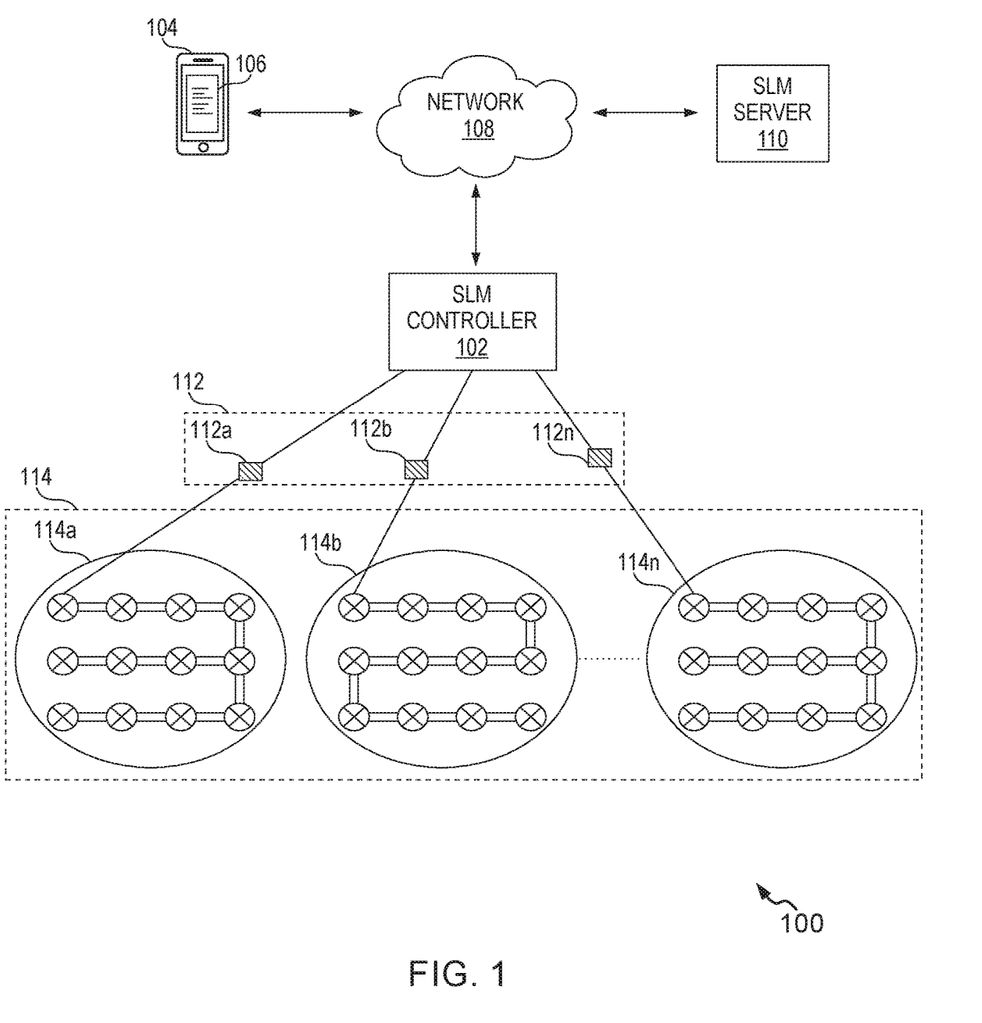
FIG. 1 is an illustration of an environment related to at least some example embodiments of the present disclosure.

FIG. 1 is an example representation of an environment 100 related to at least some example embodiments of the present disclosure. In an embodiment, the environment 100 includes a smart lighting management (SLM) controller 102, a user device 104, a user application 106, a communication network 108, an SLM server 110, one or more sensors 112*a*, 112*b* . . . 112*n*, and one or more lighting circuits 114*a*, 114*b* . . . 114*n*. It shall be noted that one SLM controller 102 has been depicted in environment 100, however, more than one SLM controller 102 may be included in the environment 100. Each SLM server 110 may manage one or more SLM controllers and each SLM controller 102 may manage one or more lighting circuits 114*a* to 114*n*.

The SLM controller 102 is deployed by a service provider in-line with the one or more lighting circuits, receives a voltage line via an AC input (not shown in FIG. 1), and has an AC output (not shown in FIG. 1). The SLM controller 102 can be installed before the first lighting element in a lighting circuit(s) associated with the SLM controller 102. The service provider provides smart lighting management (SLM) services to manage lighting circuits associated with users. The SLM controller 102 is connected to the one or more lighting circuits 114a, 114b . . . 114n through a current sensor 112 associated with each lighting circuit. The SLM controller 102 is in communication with an SLM server 110 managed by the service provider. The SLM controller 102 is configured to monitor the one or more lighting circuits 114 connected to the SLM controller 102. To perform monitoring, the SLM controller 102 is configured to receive data related to the current in a lighting circuit from a current sensor 112 attached to the lighting circuit. The SLM controller 102 may detect a change in the current in a lighting circuit while monitoring the one or more lighting circuits 114a-114n. In an example, the SLM controller 102 detects a change in the current in the lighting circuit 114a based on the data received from the current sensor 112a associated with the lighting circuit 114a. Since, the SLM controller 102 is installed within a closed lighting circuit, the only draw of power on this line is from lights on the closed lighting circuit. Thus, any changes in the total power consumption of the line (calculated based on the current as recorded by the sensor 112) correspond to power usage by bulbs within the closed lighting circuit.

The SLM controller 102 is configured to determine an anomaly based on at least the detected change in the current in the lighting circuit 114 and a threshold value. Anomalies are defined as deviations from a standard value and in this disclosure, anomalies in a lighting circuit may include, but are not limited to, burning out of a bulb, flickering of a bulb, installation of a new bulb, and the like. The SLM controller 102 may transmit a report including the determined anomaly and the data related to the detected change in the current in the lighting circuit to the SLM server 110 for verification of the anomaly by the SLM server 110 before sending a notification to a user of the user device 104. Various components of the SLM controller 102 and further details of the SLM controller 102 are explained later in reference to FIG. 2

The user device 104 may be any communication device having hardware components for enabling User Interfaces (UIs) of an SLM application 106 to be presented on the user device 104. The user device 104 may be capable of being connected to a wireless communication network (such as the network 108). Examples of the user device may include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like. The user device 104 is configured to send instructions to dim the lights in the lighting circuits and/or to switch on or off the lights in the lighting circuits. The user device 104 is further configured to send instructions to change a threshold value of a lighting circuit through the SLM application's user interface 106. The instructions are sent from the user device 104 to the SLM server 110.

The SLM server 110 is managed by the service provider for smart lighting management of lighting circuits associated with a user. More specifically, the SLM server 110 communicates with the user device 104 and the SLM controller 102 to manage the one or more lighting circuits 114a to 114n. Initially, the SLM server 110 receives data regarding the current driven in one or more lighting circuits 114a to 114n from one or more SLM controllers. The SLM server 110 trains an artificial intelligence (AI) model based on the received initial data from the one or more SLM controllers and the SLM server 110 determines a list of anomalies based on the received initial data. Further, the SLM server 110 determines a threshold value for each lighting circuit of the SLM controller 102 and transmits the information regarding the list of anomalies and a threshold value for each lighting circuit to the respective SLM controller via the network 108. Examples of the network 108 may include a wired network, a wireless network, or a combination of wired and wireless networks. Some non-limiting examples of the wired networks may include the Ethernet, the Local Area Network (LAN), a fiber-optic network, and the like. Some non-limiting examples of the wireless networks may include the Wireless LAN (WLAN), cellular networks, Bluetooth or ZigBee networks, and the like.

The sensors 112 may be current sensors or other sensors to sense the current or wattage of a closed circuit path (e.g., a lighting circuit 114). The sensors 112 can thus read the instantaneous current or wattage across the closed lighting circuit. In one example embodiment, the current sensor 112 may be part of the SLM controller 102. In another example embodiment, a current sensor 112 is external to the SLM controller 102 and is connected to a lighting circuit to measure the current flown through the lighting circuit and transmit analog data related to the current flown to the SLM controller 102. For example, the current sensor 112a measures the current flow in the lighting circuit 114a and transmits data related to the current flown in the lighting circuit 114a to the SLM controller 102.

A lighting circuit 114 is an electrical circuit that includes one or more lighting elements (such as incandescent light bulbs, Halogen incandescent light bulbs, fluorescent light bulbs, compact fluorescent bulbs (CFLs), and LED light bulbs, etc.) that are interconnected in series and/or parallel connections. The lighting circuit 114 may correspond to the interconnection of one or more lighting elements.

Figure 2:
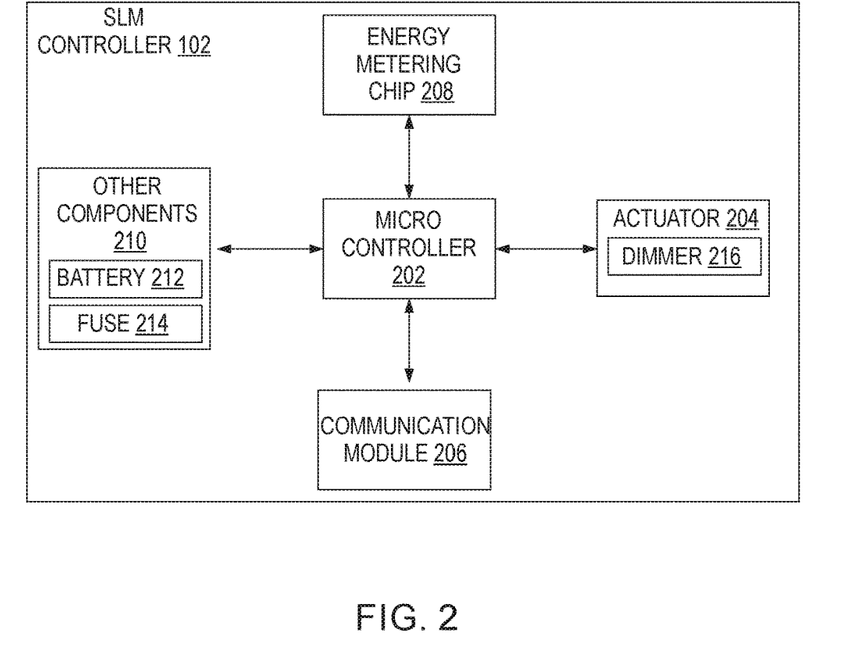
FIG. 2 is a block diagram of a smart lighting management (SLM) controller configured to manage one or more lighting circuits, in accordance with an embodiment of the present disclosure.

FIG. 2 is a block diagram of an SLM controller 102 which is configured to control one or more lighting circuits in a building, in accordance with an embodiment of the invention.

The SLM controller 102 is depicted to include a microcontroller 202, an actuator 204, a communication module 206, an energy metering chip 208, and other components 210 such as, but not limited to, a battery 212 and a fuse 214. It is noted that although the SLM controller 102 is depicted to include the microcontroller 202, the actuator 204, the communication module 206, the energy metering chip 208, and other components 210, in some embodiments, the SLM controller 102 may include more or fewer components than those depicted herein. The various components of the SLM controller 102 may be implemented using hardware, software, firmware, or any combination thereof.

In one embodiment, the microcontroller 202 may be embodied as a multi-core processor, a single-core processor, or a combination of one or more multi-core processors and one or more single-core processors. For example, the microcontroller 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application-specific integrated circuit (ASIC), a graphic processing unit (GPU), a field-programmable gate array (FPGA), a hardware accelerator, a special-purpose computer chip, or the like. In an embodiment, the microcontroller 202 may be configured to execute hard-coded functionality. In an embodiment, the microcontroller 202 is embodied as an executor of software instructions, wherein the instructions may specifically configure the microcontroller 202 to perform the algorithms and/or operations described herein when the instructions are executed.

The actuator 204 is configured to control the current in a lighting circuit. The actuator 204 includes a dimmer 216 that is configured to dim lights in the lighting circuit upon receiving an instruction from the microcontroller 202. For example, a user (shown in FIG. 1) can send an instruction to the SLM server 110 by clicking upon a function in the user application 106 to dim the lights at his place. The actuator 204 is further configured to switch on or off the lights in the lighting circuit upon receiving an instruction from the microcontroller 202.

The communication module 206 is configured to facilitate communication between the SLM controller 102 and one or more components in the environment 100 using a wired network, a wireless network, or a combination of wired and wireless networks. Some non-limiting examples of the wired networks may include the Ethernet, the Local Area Network (LAN), a fiber-optic network, and the like. Some non-limiting examples of the wireless networks may include the Wireless LAN (WLAN), cellular networks, Bluetooth or ZigBee networks, and the like. Further, the communication module 208 is electrically coupled to the microcontroller 202.

In an example embodiment, the communication module 206 receives a threshold value and list of anomalies for a lighting circuit from the SLM server 110 (shown in FIG. 1). The threshold value and the list of anomalies are used by the microcontroller 202 to identify an anomaly in a lighting circuit. The threshold value and the list of anomalies are different for different lighting circuits managed by the SLM controller 102. The communication module 206 transfers the received threshold value and list of anomalies for the lighting circuit to the microcontroller 202 for storage and for the determination of an anomaly in a lighting circuit which will be explained later in this description.

The energy metering chip 208 is configured to measure current and power consumed by a lighting circuit through a current sensor (such as the sensor 112a in FIG. 1). The energy metering chip 208 provides data related to current and power consumed by the lighting circuit to the microcontroller 202. In one embodiment, the energy metering chip 208 may measure only current in the lighting circuit and provides the measured current data to the microcontroller, which will later determine the power consumed based on the measured current data.

To determine the power consumed by the lighting circuit, the microcontroller 202 is further configured to calculate the power (PwA TT) consumed based on current using the following expression (1):

$$P_{WATT} = V_{AC} \cdot I_{RMS} \quad (1)$$

where $V_{AC}$ is the standard supply voltage from a grid, which may vary from country to country and $I_{RMS}$ is the current measured in the lighting circuit by the energy metering chip 208.

In addition to a determination of the power consumed, the microcontroller 202 is further configured to detect a change in current and/or power consumed by a lighting circuit based on the data received from the energy metering chip 208. The microcontroller 202 may calculate the difference in current value and power value in the lighting circuit using expressions (2) and (3):

$$I(\text{dropped}) = I(\text{before drop}) - I(\text{present}) \quad (2)$$

$$P(\text{dropped}) = P(\text{before drop}) - P(\text{present}) \quad (3)$$

Further, the microcontroller 202 is configured to determine an anomaly based on at least the detected change in current. The threshold value received from the SLM server 110 may also be used to determine the anomaly. In one example embodiment, the energy metering chip 208 may also determine an anomaly and send the report to the microcontroller 202 indicating detection of an anomaly in the lighting circuit for verification of the anomaly. The microcontroller 202 is further configured to determine the anomaly based at least on a comparison between the detected change in current and/or power, and the threshold value of the lighting circuit. Further, for the comparison, the microcontroller 202 is configured to determine whether the detected change in current and/or power is greater than the threshold value or less than the threshold value, or equal to the threshold value.

Upon determination of the anomaly, the communication module 206 transmits a report including information regarding the determination of an anomaly to the SLM server 110 (shown in FIG. 1) for verification of the anomaly. The report further includes information regarding the change in the current in the lighting circuit and the location of the lighting circuit.

In general, a change in current indicates that there is a change in the total resistance offered by a circuit. If the resistance of a circuit is changed, then the current flown through the circuit also changes. Any lighting element offers some resistance while connected to a circuit. Therefore, changes in currents are identified as anomalies by the SLM server and the changes in currents indicate that there is a change in the overall resistance of the circuit, which in turn indicates that a bulb is malfunctioning. If a bulb in the lighting circuit is burned out, then the overall resistance of the circuit changes leading to a change in current drawn by the circuit. Therefore, changes in current are identified to determine whether any bulb in the lighting circuit is malfunctioning. The lighting circuit may be an interconnection of bulbs in a building managed by the user (shown in FIG. 1). In order to make the circuit smarter, the SLM controller is installed at the start of the lighting circuit. The SLM controller communicates with an SLM server such as the SLM server 110, which in turn notifies the user in case of identification of an anomaly in the lighting circuit.

In addition, the communication module 206 may receive instructions from an SLM server 110 to regulate the current or power supplied to a lighting circuit associated with a user. The SLM server 110 may receive the instructions from the user device (such as the user device 104). The microcontroller 202, upon receiving instructions from the communication module 206, indicates to the actuator 204 to dim the lights in the lighting circuit, to switch on or off the lights in the lighting circuit associated with a user of the user device. The communication module 206 is configured to receive an AI model from the SLM server. Further, the communication module 206 is configured to receive an updated threshold value and an updated list of anomalies from the SLM server 110. In addition to the updated threshold and the updated list of anomalies, the communication module 206 may receive an updated AI model from the SLM server to determine an anomaly at the SLM controller 102.

Figure 3:
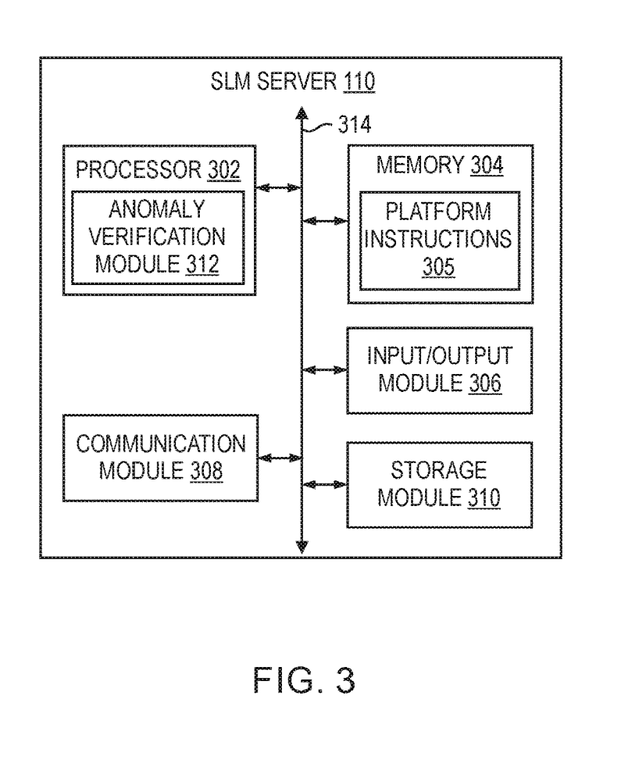
FIG. 3 is a block diagram of an SLM server configured to manage one or more SLM controllers, in accordance with an embodiment of the present disclosure.

FIG. 3 is a block diagram of an SLM server 110, in accordance with an example embodiment. In some embodiments, the SLM server 110 is embodied as a cloud-based and/or SaaS-based (software as a service) architecture. The SLM server 110 is configured to facilitate a user interface of the SLM application. In an embodiment, the SLM server 110 further includes at least one processor 302 for executing instructions, a memory 304, an input/output module 306, a communication module 308, a storage module 310, and a centralized circuit system 314. The processor 302 includes an anomaly verification module 312.

The processor 302 includes suitable logic, circuitry, and/or interfaces to execute operations for receiving data from an SLM controller upon installation of the SLM controller in line with a lighting circuit. Examples of the processor 302 include, but are not limited to, an application-specific integrated circuit (ASIC) processor, a reduced instruction set computing (RISC) processor, a complex instruction set computing (CISC) processor, a field-programmable gate array (FPGA), and the like. The memory 304 includes suitable logic, circuitry, and/or interfaces to store a set of computer-readable instructions 305 for performing operations. Examples of the memory 304 include a random-access memory (RAM), a read-only memory (ROM), a removable storage drive, a hard disk drive (HDD), and the like. It will be apparent to a person skilled in the art that the scope of the disclosure is not limited to realizing the memory 304, as described herein. In another embodiment, the memory 304 may be realized in the form of a database server or a cloud storage, without departing from the scope of the present disclosure.

The processor 302 is operatively coupled to the communication module 308 such that the processor 302 is capable of communicating with SLM controllers and user devices, or communicating with any entity connected to the network 108 (as shown in FIG. 1).

In an embodiment, the Input/Output module 306 (hereinafter referred to as 'I/O module') may include mechanisms configured to receive inputs from and provide outputs to the operator(s) of the SLM server 110. To that effect, the I/O module 306 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light-emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 302 may include I/O circuitry configured to control at least some functions of one or more elements of the I/O module 306, such as, for example, a speaker, a microphone, a display, and/or the like. The processor 302 and/or the I/O circuitry may be configured to control one or more functions of the one or more elements of the I/O module 306 through computer program instructions 305, for example, software and/or firmware, stored on a memory, for example, the memory 304, and/or the like, accessible to the processor 302.

The communication module 308 may include communication circuitry such as a transceiver circuitry including antenna and other communication media interfaces to facilitate communication between the SLM server 110 and one or more remote entities such as the SLM controller 102 and the user device 104 over a communication network (such as network 108 shown in FIG. 1).

In some embodiments, the storage module 310 is integrated within SLM server 110. For example, the storage module 310 may include one or more hard disk drives. A storage interface (not shown in FIG. 3) is any component capable of providing the processor 302 with access to the storage module 310. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the storage module 310.

In one embodiment, the storage module 310 is configured to store user profile data associated with a user of the user device, such as the user device 104. The storage module 310 is also configured to store the details of the SLM controllers installed at lighting circuits associated with each user. For example, the storage module 310 may store information regarding the number of lighting circuits associated with each user registered with the SLM application.

The various components of the SLM server 110, such as the processor 302 for executing instructions, a memory 304, an input/output module 306, and a communication module 308, a storage module 310 are configured to communicate with each other via or through a centralized circuit system 314. The centralized circuit system 314 may be various devices configured to, among other things, provide or enable communication between the components of the SLM server 110. In certain embodiments, the centralized circuit system 314 may be a central printed circuit board (PCB) such as a motherboard, a mainboard, a system board, or a logic board. The centralized circuit system 314 may also, or alternatively, include other printed circuit assemblies (PCAs) or communication channel media.

It is noted that the SLM server 110 as illustrated and hereinafter described is merely illustrative of an apparatus that could benefit from embodiments of the present disclosure and, therefore, should not be taken to limit the scope of the present disclosure. It is noted that the SLM server 110 may include fewer or more components than those depicted in FIG. 3.

In an embodiment, the communication module 308 is configured to receive a request for installation of an SLM controller in line with a lighting circuit in a building associated with a user. Upon reception of the request, the service provider associated with the SLM application installs the SLM controller at the user's building. Upon installation of the SLM controller in line with the lighting circuit, the communication module 308 may receive information related to the current in the lighting circuit. The information may further include details related to the number of lighting elements (e.g., bulbs) in the circuit and details related to the wattage of each bulb in the lighting circuit. For example, the communication module 308 may receive information that there are 10 bulbs in a lighting circuit and the bulbs may have power ratings of 5 W, 10 W, 15 W, 35 W, 50 W, 75 W, 100 W, 120 W, and 150 W respectively.

In one embodiment, the processor 302 is configured to determine a threshold value for each lighting circuit based on the information related to the power ratings of the bulbs in the lighting circuit. For the above example, the threshold value of the light circuit with 10 bulbs can be determined as 5 W to identify the burnout of the lowest power rating bulb in the circuit. In case of identification of burnout of only higher power rating bulbs, the threshold value can be determined to be 75 W to identify the burnout/missing of bulbs having a power rating higher than In one example embodiment, the threshold value can be set by the user by accessing the SLM application 106 on the user device 104.

The processor 302 is further configured to determine a list of anomalies based on the initial data received from the SLM controller. The list of anomalies may include, but are not limited to, burning out of a bulb/missing of a bulb, flickering of a bulb, etc. The processor 302 may include an AI model trained with the initial data and data from the network (such as the network 108) to identify a list of anomalies. Further, the processor 302 may be configured to update/upgrade the AI model based on the real-time data received from the SLM controller for efficient classification and identification of anomalies.

The communication module 308 is configured to transmit the list of anomalies and/or the AI model to the SLM controller for the identification of an anomaly at the SLM controller's end. The communication module 308 may also send the updated AI model to the SLM controller upon updating the AI model at the SLM server 110.

In an example embodiment, upon setting up of the SLM controller 102 at the user's building, the communication module 308 is further configured to receive a report indicating the determination of an anomaly at the SLM controller 102 and the data related to change in the current/power in the lighting circuit.

The processor 302 may include an anomaly verification module 312 to verify the anomaly determined at the SLM controller's end. The anomaly verification module 312 is configured to verify the anomaly based on the data related to the change in current. The anomaly verification module 312 is configured to compare the change in current with the threshold value assigned to the lighting circuit and verifies the anomaly for the detected deviation from the threshold value. For example, if the drop in the power of a circuit is 5 W, then an anomaly is detected upon comparing the drop in the power of the circuit with the threshold value. If the threshold value is 5 W, then it is determined that a bulb with a power rating of 5 W is missing from the circuit or may have burned out. An example of different types of anomalies is explained later with reference to FIGS. 5A and 5B.

The communication module 308 is configured to send a notification to the user device indicating that an anomaly has occurred in the lighting circuit associated with the user. The notification is sent upon successful verification of the anomaly by the processor 302. In addition to the sending of the notification, the communication module 308 is further configured to send the location of the lighting circuit in which the bulb has been burned out. For example, upon successful verification of an anomaly that indicates a bulb in a circuit is burned out, the communication module 308 sends a notification to the user device indicating that a bulb has been burned out in one of the circuits and the location of the lighting circuit. An example of the notification being sent is explained later with reference to FIGS. 7A and 7B.

The processor 302 may be configured to update the threshold value for a lighting circuit, upon receiving an instruction from the user. In one embodiment, the processor 302 is configured to update the threshold value of a lighting circuit, without the intervention of the user, based on the information received from the SLM controller, where the information includes details of the number of bulbs in the lighting circuit and power ratings of the bulbs in the lighting circuit. Further, the processor 302 is configured to update anomalies based on the data received from the SLM controller, where the data received includes a change in current/power in a lighting circuit.

Thereafter, the communication module 308 is configured to send the updated threshold value and updated anomalies to the SLM controller for the efficient identification of anomalies in the lighting circuit.

Figure 4:
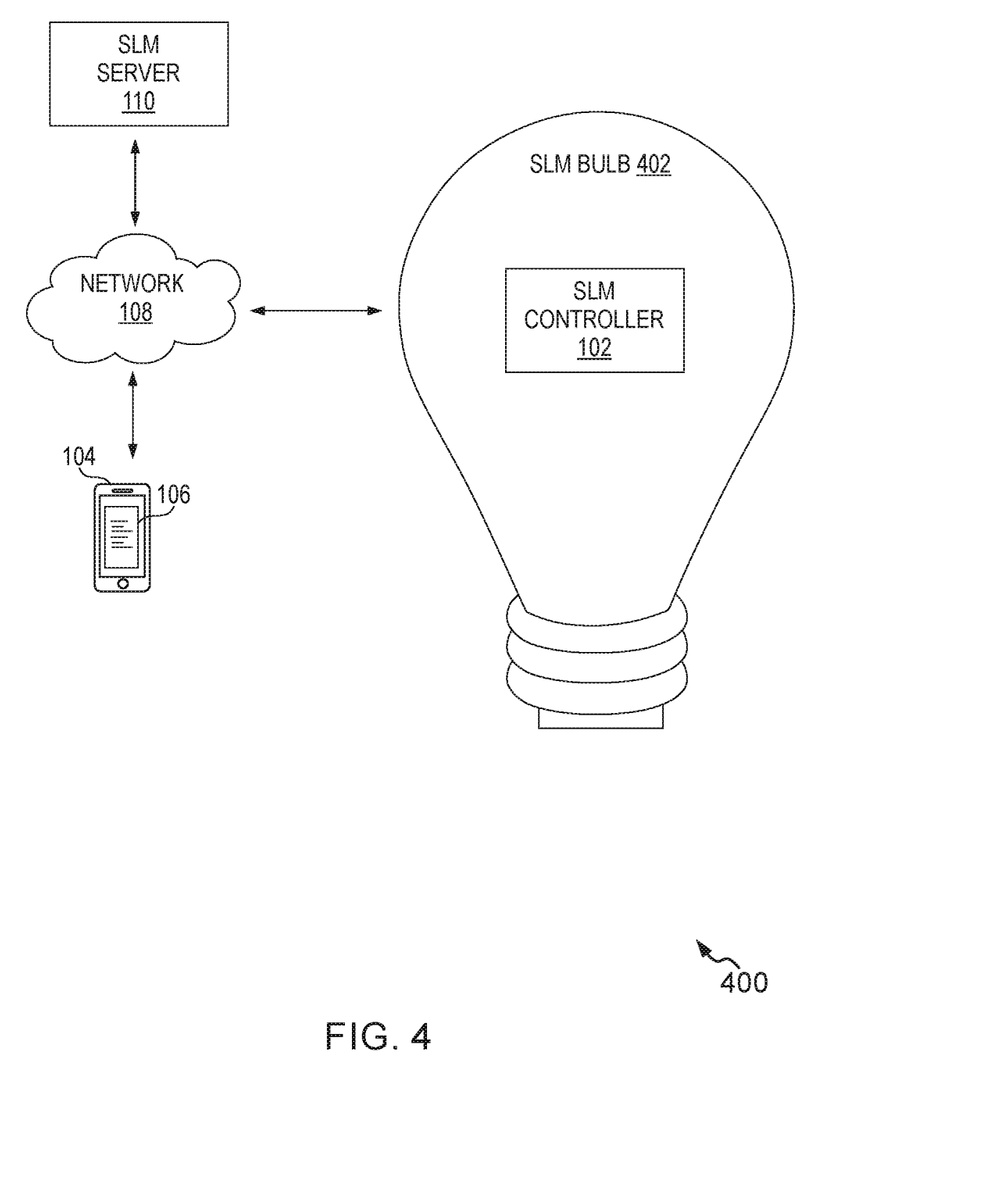
FIG. 4 is an illustration of an environment related to an embodiment of the present disclosure.

FIG. 4 is an example representation of an environment 400 related to at least some example embodiments of the present disclosure. In an embodiment, the environment 400 includes SLM bulb 402, a user device 104, a network 108, and an SLM server 110. The SLM bulb 402 is a lighting element that includes an SLM controller 102 as explained with reference to FIG. 2. The components in FIG. 4 are similar to the components in FIG. 1, therefore they are not explained here. The only difference between FIG. 1 and FIG. 4 is that SLM bulb 402 can manage only one lighting circuit to which the SLM bulb 402 is connected. However, SLM controller 102 can manage one or more lighting circuits. The SLM bulb 402 has to be placed in the mainline of a lighting circuit for efficient management of the lighting circuit, which will be explained later with reference to FIG. 6.

Figure 5A:
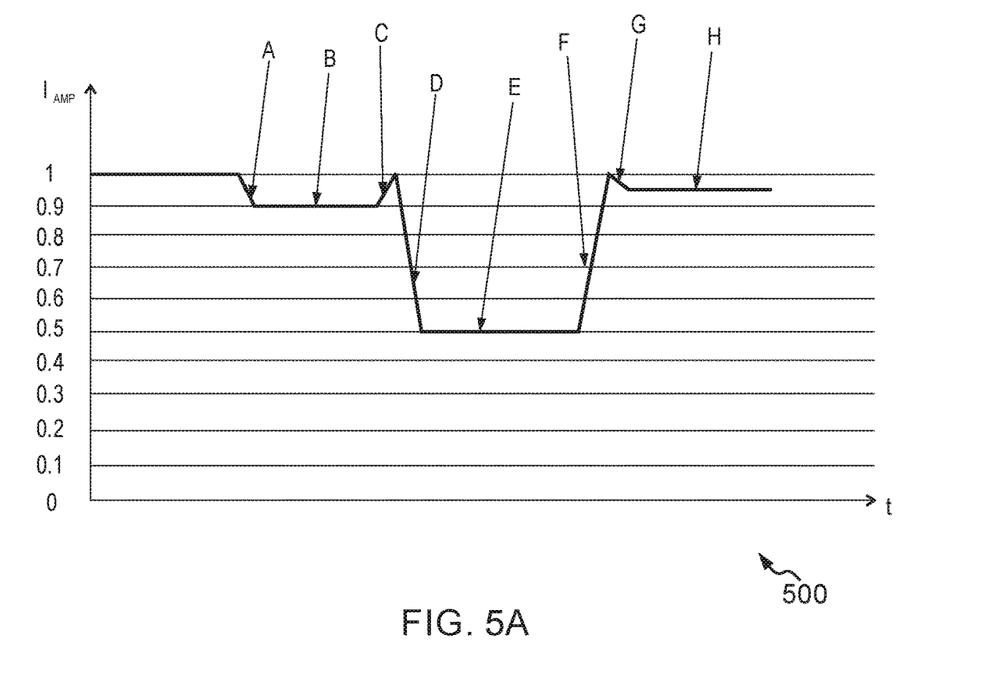
FIG. 5A depicts a graph plotted between time on the horizontal axis and current on the vertical axis, in accordance with an embodiment of the present disclosure.
Figure 5B:
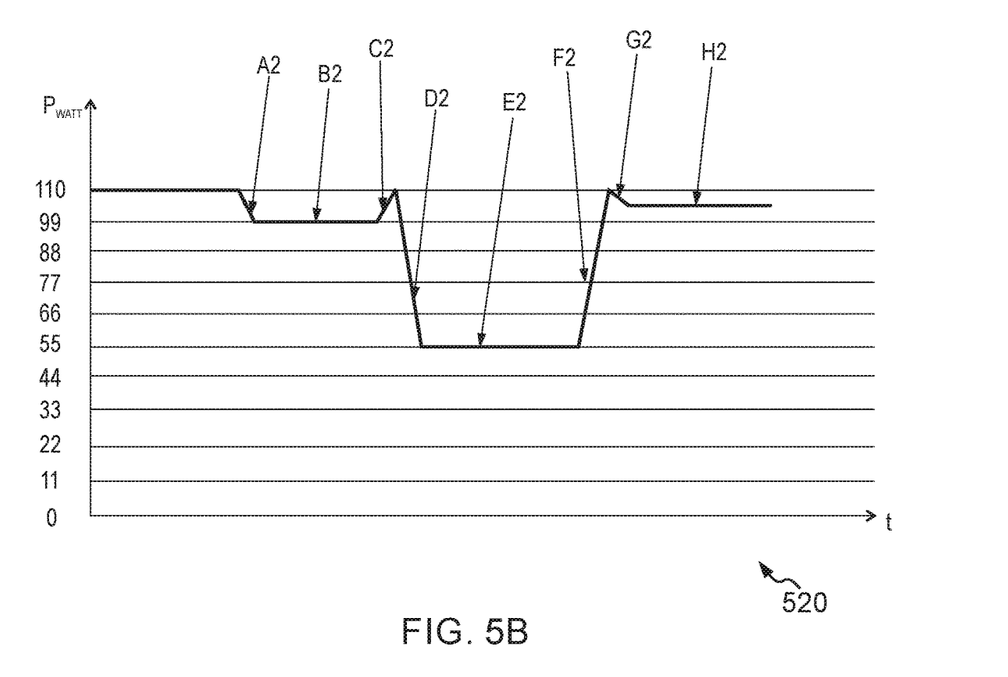
FIG. 5B depicts a graph plotted between time on the horizontal axis and power on the vertical axis, in accordance with an embodiment of the present disclosure.

FIGS. 5A and 5B show example graphs 500 and 520 for illustrating different types of anomalies based on a drop in current and power, in accordance with an embodiment. FIG. 5A is a graph including a plot between current vs. time in a circuit. FIG. 5B is a graph including a plot between power vs. time in a circuit. In FIGS. 5A and 5B, A and A2 show that there is a drop in current and power in the circuit, which indicates that one bulb is missing based on $P_{drop}=11$ W, $I_{drop}=0.10$A. B and B2 in the graphs show that a consistent drop in current and power is seen, which will be processed by the SLM controller for determination of the anomaly and the SLM server will send information as a notification to the SLM application on the user device. C and C2 in the graphs show that the 11 W bulb is added to the circuit. Similarly, D and D2 show that one bulb is missing based on the $P_{drop}=55$ W, $I_{drop}=0.5$A and it is determined that the wattage of the bulb is 55 W. E and E2 in the graphs show that a consistent drop in current and power is seen, which will be processed by the SLM controller and the SLM server will send information as a notification to the SLM application on the user device. F and F2 in the graphs show that the 55 W bulb is added to the circuit. G and G2 show that one bulb is missing based on the $P_{drop}=5$ W, $I_{drop}=0.045$A and it is determined that the wattage of the bulb is 5 W. H and H2 in the graphs show that a consistent drop in current and power is seen, which will be processed by the SLM controller and the SLM server will send information as a notification to the SLM application on the user device that the bulb has to be replaced.

Figure 6:
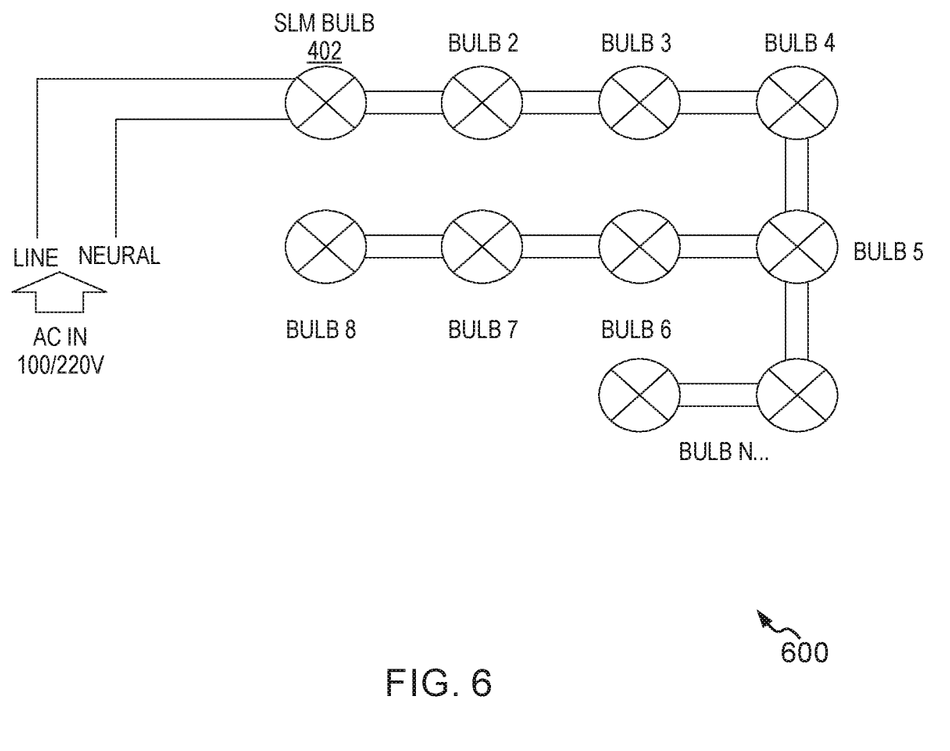
FIG. 6 shows an illustration depicting a lighting circuit including an SLM bulb, in accordance with an embodiment of the present disclosure.

FIG. 6 shows an example illustration 600 depicting an SLM bulb 402 managing a lighting circuit. In illustration 600, the SLM bulb 402 is located at the start of a lighting circuit for exemplary purposes. However, the SLM bulb 402 can also be inserted in the place of bulbs 2, 3, or 4 in the lighting circuit shown in illustration 600, rather than at the start of the lighting circuit.

Figure 7A:
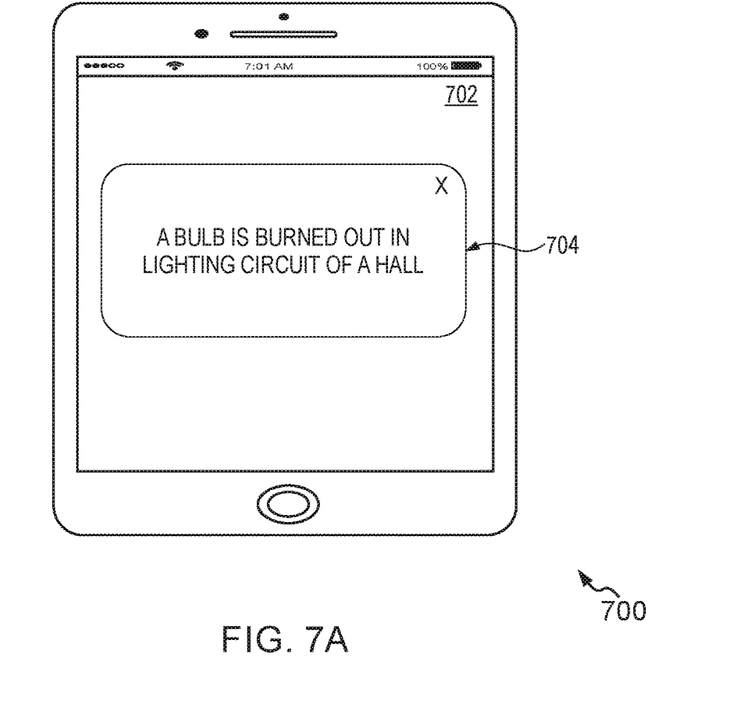
FIGS. 7A and 7B depict an example representation of a user interface of an SLM application, in accordance with an embodiment of the present disclosure.
Figure 7B:
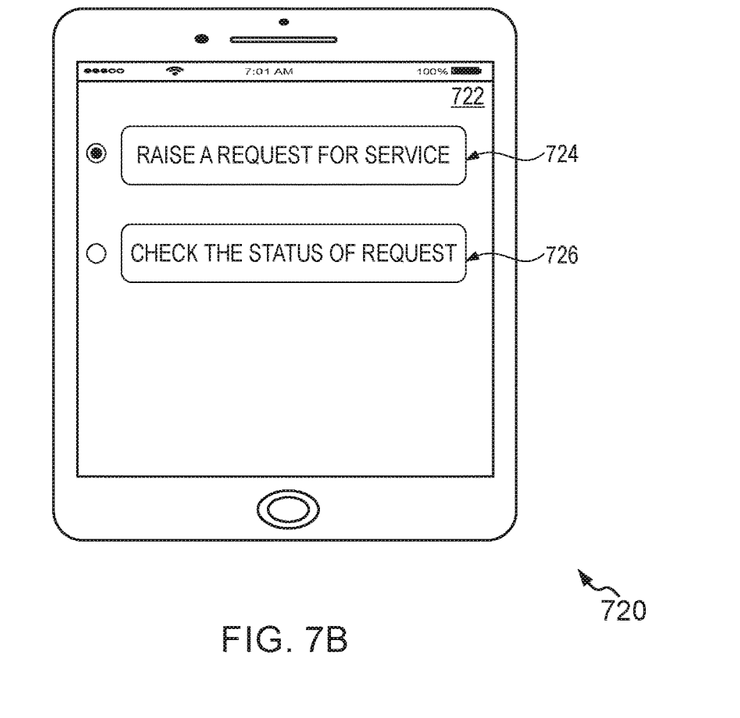

FIGS. 7A and 7B show illustrations 700 and 720 of a user interface of the SLM application installed on the user device, in accordance with an embodiment. FIG. 7A shows an illustration 700 of a user interface 702 of the SLM application, in accordance with an embodiment. The user interface 702 displays a notification 704 being sent by the SLM server (such as the SLM server 110). The notification indicates that a bulb is burned out in the lighting circuit of a hall at the user's place. In an example embodiment, the user can perform certain actions based on the notification received on the user device. In one embodiment, the user may raise a request for service which is shown in FIG. 7B. In one embodiment, the SLM server can raise a request for service without the intervention of the user.

FIG. 7B shows an illustration of a user interface 722 of the SLM application, in accordance with an embodiment. The user interface 722 displays two options 724 and 726 available to the user upon receiving a notification from the SLM server 110. It shall be noted that there may be multiple options, and two options are shown for the sake of simplicity and example purposes only. The option 724 displayed on the user interface 722 indicates that the user may raise a request for service upon receiving a notification regarding the malfunctioning of a bulb in a lighting circuit associated with the user. The other option 726 is to check the status of the request already raised by the user, for example, whether a technician is assigned for the repair/replacement of the bulb in the lighting circuit.

Figure 8:
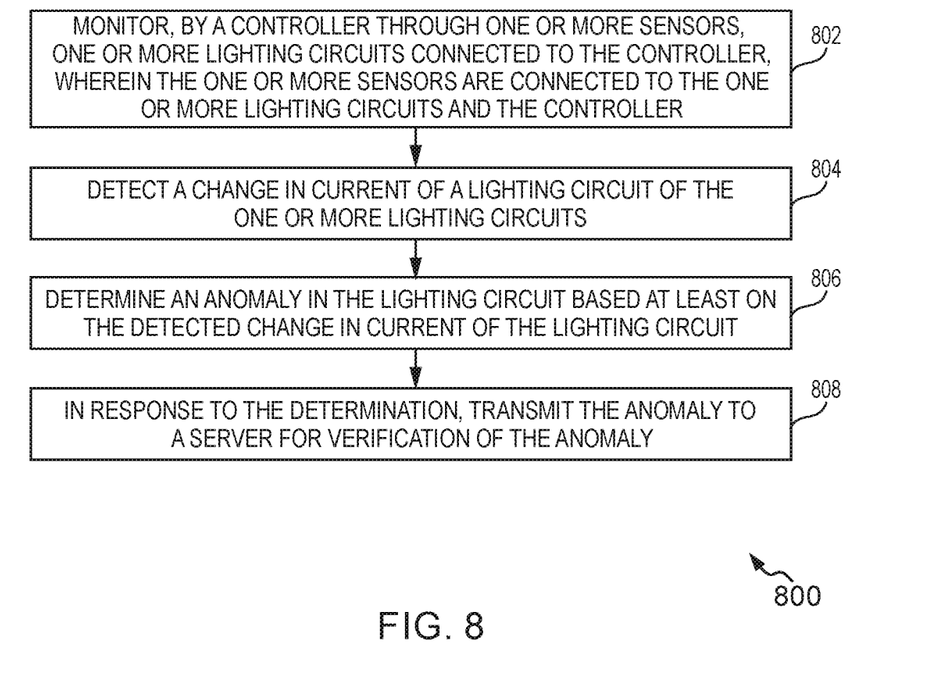
FIG. 8 is a flow chart depicting a method performed by an SLM controller, in accordance with an embodiment of the present disclosure.

FIG. 8 represents a flow diagram depicting a method 800 for managing one or more lighting circuits, in accordance with an example embodiment of the present disclosure. The method 800 depicted in the flow diagram may be executed by a controller (e.g., the SLM controller 102). Operations of the method 800 and a combination of operations in the flow diagram, may be implemented by, for example, hardware, firmware, a processor, circuitry, and/or a different device associated with the execution of software that includes one or more computed program instructions. The method 800 starts at operation 802.

At operation 802, the controller monitors one or more lighting circuits connected to the controller through one or more sensors connected to the one or more lighting circuits. For example, the SLM controller 102 monitors one or more lighting circuits 114*a* to 114*n* through one or more sensors 112*a* to 112*n*.

At operation 804, the controller detects a change in current of a lighting circuit of the one or more lighting circuits. For example, the SLM controller 102 may detect a change in current of the lighting circuit 114*a*.

At operation 806, the controller determines an anomaly in the lighting circuit based at least on the detected change in current of the lighting circuit. For example, the SLM controller 102 may determine an anomaly in the lighting circuit 114*a* based on the detected change in current of the lighting circuit 114*a*.

At operation 808, the controller transmits a report including at least the determined anomaly to a server for verification of the anomaly. The SLM controller 102 may transmit a report to the SLM server indicating that an anomaly is determined in the lighting circuit 114*a*.

Figure 9:
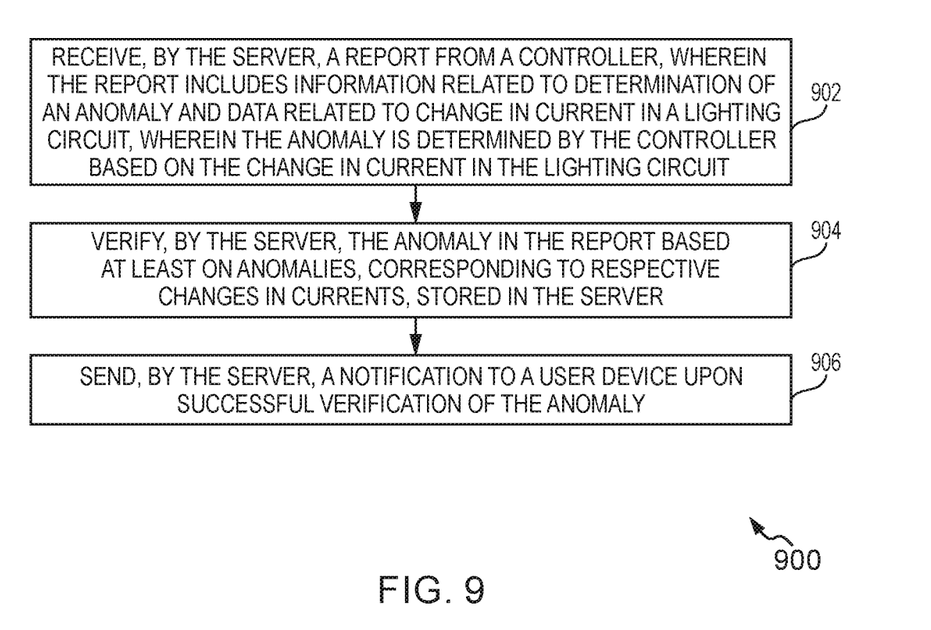
FIG. 9 is a flow chart depicting a method performed by an SLM server, in accordance with an embodiment of the present disclosure.

FIG. 9 represents a flow diagram depicting a method 900 for managing one or more SLM controllers, in accordance with an exemplary embodiment of the present disclosure. The method 900 depicted in the flow diagram may be executed by a server (e.g., the SLM server 110). Operations of the method 900 and combinations of operations in the flow diagram, may be implemented by, for example, hardware, firmware, a processor, circuitry, and/or a different device associated with the execution of software that includes one or more computed program instructions. The method 900 starts at operation 902.

At operation 902, the server receives a report from a controller, where the report includes information related to a determination of an anomaly and data related to a change in current. The anomaly is determined by the controller based on the change in current in the lighting circuit. For example, the SLM server 110 receives a report from an SLM controller 102 and the report includes information related to the determination of an anomaly by the SLM controller 102 and detected change in current in the lighting circuit 114*a*.

At operation 904, the server verifies the anomaly in the report based at least on anomalies, corresponding to changes in current values, stored in the server. For example, the SLM server 110 may verify the anomaly determined by the SLM controller in the lighting circuit 114*a*.

At operation 906, the server sends a notification to a user device upon successful verification of the anomaly, where the user device is associated with the lighting circuit.

The disclosed methods with reference to FIGS. 8-9, or one or more operations of the flow diagrams 800 and 900 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), mobile communications, or other such communication means.

Various embodiments of the present disclosure eliminate the hassle of constantly trying to find which bulb has the flicker, is blown, or other maintenance that may be needed because the application itself would notify users of the issue. The embodiments herein allow us to upgrade the common area lighting circuits through a smart application from the palm of our hands. Installing SLM to every commercial building's lighting will introduce automation and efficiency to the commercial building's lighting. The embodiments of SLM networking application features allow property owners and managers to fully control their common area lighting, such as daylight saving schedule, as well as the exact placement and amount of maintenance needed. Further, the life cycle of the bulbs can be improved by switching on and off lights when there is no requirement for light in the building, and by dimming the lights from the user device. The embodiments describe that the SLM application can automatically assign the maintenance needs with the location and type of the bad bulb to the nearest handyman or electricians who already signed up with the SLM application.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for management of lighting circuits, the method comprising:
   monitoring, by a controller through one or more sensors, one or more lighting circuits connected to the controller, wherein the one or more sensors are connected to the one or more lighting circuits and the controller;
   detecting a change in current of a lighting circuit of the one or more lighting circuits;
   determining an anomaly in the lighting circuit based at least on the detected change in current of the lighting circuit; and
   in response to the determination, transmitting a report including at least the anomaly to a server for verification of the anomaly; and
   wherein receiving, by the server, initial data related to the one or more lighting circuits from one or more controllers;
   training, by the server, an artificial intelligence (AI) model based on the initial data to determine the anomalies; and
   sending, by the server, the AI model to the controller for determination of the anomaly at the controller.

2. The method of claim 1, wherein the monitoring comprises receiving data from the one or more sensors connected to each of the one or more lighting circuits.

3. The method of claim 1, wherein determining the anomaly comprises comparing the change in current with a threshold value, and identifying the anomaly based on the comparison, wherein the threshold is configured to be set by the user.

4. The method of claim 3, wherein comparing the change in current with the threshold value includes whether the detected change in current is less than the threshold value or greater than the threshold value, or equal to the threshold value.

5. The method of claim 3, wherein the threshold value is determined based on the power rating of a bulb in the one or more lighting circuits, and wherein the threshold value is different for each lighting circuit of the one or more lighting circuits.

6. The method of claim 1, wherein a number of bulb is configured to be determined based upon the drop in current and power.

7. A method for management of lighting circuits, the method comprising:
   receiving, by a server, a report from a controller, wherein the report includes information related to a determination of an anomaly and data related to a change in current in a lighting circuit, and wherein the anomaly is determined by the controller based on the change in current in the lighting circuit;
   verifying, by the server, the anomaly in the report based at least on anomalies, corresponding to respective changes in current values, stored in the server, and sending, by the server, a notification to a user device upon successful verification of the anomaly, wherein the user device is associated with the lighting circuit; and
   receiving, by the server, initial data related to one or more lighting circuits from one or more controllers;
   training, by the server, an artificial intelligence (AI) model based on the initial data to determine the anomalies; and
   sending, by the server, the AI model to the controller for determination of the anomaly at the controller.

8. The method of claim 7, wherein the notification includes information regarding an anomaly and a location of the lighting circuit in which the anomaly has occurred, wherein the notification can also be forwarded to electrician or handyman based on the location.

9. A controller for management of lighting circuits, the controller comprising:
   an energy metering chip configured to monitor, through one or more sensors, one or more lighting circuits connected to the controller, wherein the one or more sensors are connected to the one or more lighting circuits and the controller;
   a microcontroller electrically coupled to the energy metering chip, the microcontroller configured to:
   detect a change in current of a lighting circuit of the one or more lighting circuits; and
   determine an anomaly in the lighting circuit based at least on the detected change in current of the lighting circuit; and
   a communication module electrically coupled to the microcontroller, the communication module configured to transmit a report including at least the anomaly to a server for verification of the anomaly, in response to the determination; and
   the server to receive initial data related to one or more lighting circuits from one or more controllers;
   training an artificial intelligence (AI) model based on the initial data to determine the anomalies; and
   sending the AI model to the controller for determination of the anomaly at the controller.

10. The controller of claim 9, further comprising an actuator electrically coupled to the microcontroller, and the actuator configured to:
    dim lights in the lighting circuit, and
    switch on or off the lights in the lighting circuit, upon receiving instructions from the server.

11. The controller of claim 9, wherein the controller is installed in line with the one or more lighting circuits, and wherein the controller is installed before a first bulb in one or more bulb or one or more lighting fixture in the one or more lighting circuits.

12. The controller of claim 9, further comprising the one or more sensors electrically coupled to the energy metering chip.

13. The controller of claim 9, wherein the controller is included in a bulb or in a light fixture.

14. The controller of claim 9, wherein the communication module is further configured to transmit initial data related to the one or more lighting circuits upon installation of the controller in line with the one or more lighting circuits.

15. The controller of claim 9, wherein the determination of the anomaly comprises a comparison of the detected change in current in the lighting circuit with a threshold value of the lighting circuit and identification of the anomaly based on the comparison.

16. The controller of claim 15, wherein the communication module is further configured to receive the threshold value for each lighting circuit from the server.

17. A server for management of lighting circuits, the server comprising:

a processor;

a communication module; and a memory for storing instructions which, when executed by the processor, cause the server, at least in part, to:

receive a report from a controller, wherein the report includes information related to a determination of an anomaly and data related to a change in current in a lighting circuit, and wherein the anomaly is determined by the controller based on the change in current in the lighting circuit;

verify the anomaly in the report based at least on anomalies, corresponding to respective changes in current values, stored in the memory of the server, and send a notification to a user device upon successful verification of the anomaly, wherein the user device is associated with the lighting circuit; and receiving initial data related to one or more lighting circuits from one or more controllers;

training, an artificial intelligence (AI) model based on the initial data to determine the anomalies; and sending the AI model to the controller for determination of the anomaly at the controller.

18. The server of claim 17, wherein the server is configured to manage the one or more controllers.

19. The server of claim 17, wherein the server is further caused, at least in part, to:

receive the initial data related to one or more lighting circuits from one or more controllers;

train an artificial intelligence (AI) model based on the initial data to determine the anomalies; and send the AI model to the controller for determination of the anomaly at the controller.

20. The server of claim 19, wherein the server is further caused, at least in part, to:

update the AI model upon receiving additional data from the controller; and send the updated AI model to the controller.

* * * * *